US011905103B2

(12) United States Patent
Klever et al.

(10) Patent No.: US 11,905,103 B2
(45) Date of Patent: Feb. 20, 2024

(54) DISPENSING SYSTEM

(71) Applicant: Dutch Renewable Energy B.V., Muiden (NL)

(72) Inventors: Diede Hendrik Paul Klever, Muiden (NL); Hubert Clemens Pellikaan, Utrecht (NL)

(73) Assignee: Dutch Renewable Energy B.V., Muiden (NL)

(*) Notice: Subject to any disclaimer, the term of this patent is extended or adjusted under 35 U.S.C. 154(b) by 0 days.

(21) Appl. No.: 17/908,254

(22) PCT Filed: Mar. 1, 2021

(86) PCT No.: PCT/NL2021/050135
§ 371 (c)(1),
(2) Date: Aug. 31, 2022

(87) PCT Pub. No.: WO2021/177815
PCT Pub. Date: Sep. 10, 2021

(65) Prior Publication Data

US 2023/0087555 A1 Mar. 23, 2023

(30) Foreign Application Priority Data

Mar. 4, 2020 (NL) ..................................... 2025048

(51) Int. Cl.

| | |
|---|---|
| ***B65D 83/20*** | (2006.01) |
| ***B65D 83/36*** | (2006.01) |

(Continued)

(52) U.S. Cl.
CPC ........... *B65D 83/54* (2013.01); *B65D 83/205* (2013.01); *B65D 83/36* (2013.01); *B65D 83/38* (2013.01);

(Continued)

(58) Field of Classification Search
CPC ...... B65D 83/54; B65D 83/205; B65D 83/36; B65D 83/38; B65D 83/386; B65D 83/752; B05B 7/0483
See application file for complete search history.

(56) References Cited

U.S. PATENT DOCUMENTS 3,451,593 A 6/1969 Dillarstone
5,125,546 A * 6/1992 Dunne ................ B01F 25/4521 222/394

(Continued)

FOREIGN PATENT DOCUMENTS

FR 2902615 A1 12/2007
GB 350091 A1 6/1931
WO 2019016105 A1 1/2019

*Primary Examiner* — Frederick C Nicolas
(74) *Attorney, Agent, or Firm* — N.V. Nederlandsch Octrooibureau

(57) ABSTRACT

The present invention relates to a dispensing system for spraying a liquid/gas mixture, the system including a dispenser and a holder in which the dispenser is held, the dispenser including a container that is adapted for holding therein a liquid phase and a gas phase that is at a pressure of 2 bar or greater and is in direct contact with the liquid phase. The dispensing system may be used in a first orientation and a second orientation, wherein the ratio of liquid to gas in the sprayed mixture is different depending on the orientation of the system during spraying.

20 Claims, 6 Drawing Sheets

(51) Int. Cl.
*B65D 83/38* (2006.01)
*B65D 83/54* (2006.01)
*B05B 7/04* (2006.01)
*B65D 83/14* (2006.01)

(52) U.S. Cl.
CPC .......... *B65D 83/386* (2013.01); *B05B 7/0483* (2013.01); *B65D 83/752* (2013.01)

(56) References Cited

U.S. PATENT DOCUMENTS

| | | | | |
|---|---|---|---|---|
| 8,800,824 | B2 * | 8/2014 | Ganan-Calvo ......... | B65D 83/44<br>222/402.1 |
| 8,881,956 | B2 * | 11/2014 | Ganan-Calvo ......... | B65D 83/20<br>222/402.18 |
| 11,564,726 | B2 * | 1/2023 | Klever ................. | B65D 83/285 |
| 2020/0146739 | A1 * | 5/2020 | Klever ................. | B65D 83/285 |

* cited by examiner

DISPENSING SYSTEM

FIELD OF THE INVENTION

The present invention relates to a dispensing system for spraying a liquid/gas mixture, the system comprising a dispenser and a holder in which the dispenser is held, the dispenser comprising a container that is adapted for holding therein a liquid phase and a gas phase that is at a pressure of 2 bar or greater and is in direct contact with the liquid phase. The dispensing system may be used in applications such as dispensing of a cosmetic spray, a sunscreen spray, a medical spray, a cryogenic spray, and/or a utility spray such as a lubricant, an anti-corrosive, a coating such as a protective coating or paint, and the like.

BACKGROUND ART

From WO 2019/016105 a dispensing system for use in cryogenic skin treatment is known, the system comprising a container comprising a liquid phase in direct contact and in equilibrium with a gas phase; an actuatable valve attached to the container and comprising a chamber and a nozzle connected to an outlet of said chamber; and a spacer attached to the valve, wherein the spacer is adapted for defining a predetermined distance between the orifice of the nozzle and a skin surface to be treated, the system further comprising a holder for moveably holding the container therein while the spacer and the nozzle are fixed with respect to the holder. The known system is generally used with the spacer in contact with the skin while the opening of the nozzle is directed downwards, so that the valve may be opened by pressing the container downwards relative to the holder and towards the skin while the nozzle remains at the predetermined distance from the skin.

A user may control the degree of opening of the valve by controlling the amount by which he or she presses the container downwards towards the spacer, in this manner also controlling a flow rate of the spray that is being dispensed to some extent. However, it is difficult to accurately control the rate at which the liquid phase in the gas/liquid mixture is dispensed. It is an object of the invention to provide a dispensing system in which the rate at which the liquid phase is dispensed can be more easily controlled.

SUMMARY OF THE INVENTION

To this end the invention provides a dispensing system for spraying a liquid/gas mixture, the dispensing system comprising a dispenser that is provided with: —a container having a first side and a second side and a longitudinal axis extending from the first side to the second side, wherein the container is adapted for holding therein a liquid phase and a gas phase with the gas phase in direct contact with the liquid phase and at a pressure of 2 bar or greater; —an actuatable valve comprising a nozzle for spraying the liquid/gas mixture upon actuation of the valve, wherein the valve is attached to the container at the first side, wherein the actuatable valve comprises a mixing chamber adapted for mixing the liquid phase and the gas phase to form the liquid/gas mixture and delivering the mixture to the nozzle, wherein the actuatable valve comprises a first conduit and a separate second conduit, both in fluid connection with the mixing chamber, arranged for passage of the liquid phase and the gas phase into the mixing chamber; wherein the dispensing system further comprises: a holder substantially surrounding the dispenser and provided with a first abutment surface for blocking movement of the dispenser out of the holder past the first abutment surface, and a second abutment surface for blocking movement of the dispenser out of the holder past the second abutment surface; wherein the valve is arranged to be actuated with the dispensing system in two different orientations, wherein:

in a first orientation the longitudinal axis of the container is oriented substantially vertically, the second side of the container is arranged vertically above the first side of the container, and the dispenser abuts the first abutment surface, with the first conduit arranged for passage of the liquid phase from the container into the mixing chamber and the second conduit arranged for passage of the gas phase from the container into the mixing chamber upon actuation of the valve, and in a second orientation the longitudinal axis of the container is oriented substantially vertically with the first side of the container above the second side of the container, and the dispenser abuts the second abutment surface, with the first conduit arranged for passage of the gas phase from the container to the mixing chamber and the second conduit arranged for passage of the liquid phase from the container to the mixing chamber upon actuation of the valve.

When the valve is actuated while the dispensing system is in the first orientation, the gas phase enters the mixing chamber through the first conduit while the liquid phase enters the mixing chamber through the second conduit, resulting in a first amount of liquid being sprayed per unit time. When the valve is actuated while the dispensing system is in the second orientation, the gas phase enters the mixing chamber though the second conduit while the liquid phase enters the mixing chamber through the first conduit, resulting in a second amount of liquid being sprayed per unit time. The first and second amount will generally differ from each other. For instance, differences in path length and/or diameter of the first conduit and the second conduit may cause a difference in amount of liquid in the gas/liquid mixture that is sprayed When actuating the valve in the first or the second orientation results in a larger amount of liquid being dispensed per unit time, a person can select the suitable orientation depending on the amount of liquid he or she intends to spray. For instance, in the first orientation, the flow rate of liquid that is sprayed may be relatively large making the first orientation suitable for rough application of liquid on a surface, and the second orientation, in which the flow rate of liquid may be smaller, a fine application of liquid on a surface can be achieved.

The liquid phase will generally comprise a liquid propellant and a product, e.g. silicon, a cosmetic composition, sunscreen or a lubricant, that is to be topically applied using the system. Examples of liquid propellants as can be used in the liquid phase include dimethyl ether, propane, isobutane, HFA134a (1,1,1,2-tetrafluoroethane), HFO-1234yf (2,3,3,3-tetrafluoropropene), butane, and hydrofluorcarbons, In an embodiment, at least when the valve is actuated, when the dispensing system is in the first orientation the dispenser is spaced apart from the second abutment surface, and when the dispensing system is the second orientation the dispenser is spaced apart from the first abutment surface. Preferably also when the valve is not actuated, in the first orientation the dispenser is spaced apart from the second abutment surface, in the second orientation the dispenser is spaced apart from the first abutment surface.

In an embodiment the mixing chamber has an operational internal volume, e.g. of 10-600 μl, and comprises a first inlet opening in connection with the first conduit; a second inlet opening in connection with the second conduit; an outlet;

and a Venturi tube having an entry cone for receiving gas or liquid phase through the second inlet opening, an exit cone and a constricted section (32*b*) that connects the entry cone with the exit cone, said constricted section or said exit cone connected to the first inlet opening, the first inlet opening having a cross-sectional opening area of $8\times10^{-3}$ to $100\times10^{-3}$ $mm^2$ and the constricted section having a cross-sectional opening area that is at least 150% larger than the cross-sectional opening area of the first inlet opening. The exit cone is connected to the outlet of the mixing chamber. When the valve is actuated in the first orientation of the system, gas phase enters the mixing chamber through first inlet opening of the Venturi tube thereby creating a Venturi effect that draws the liquid phase into the exit cone of the Venturi tube via the second inlet opening and causes dispersal of the liquid phase into the gas phase. When the system is in the second orientation while the valve is actuated, the gas phase enters the mixing chamber through the second inlet opening and the liquid phase is drawn into the mixing chamber through the first inlet opening.

In an embodiment, when the dispensing system is in the first orientation, the second side of the container is movable relative to the holder along the longitudinal direction towards the nozzle while the nozzle remains stationary to with respect to the holder, and when the system is in the second orientation, the nozzle is movable relative to the holder along the longitudinal direction towards the second side of the container while said second side remains stationary with respect to the holder.

In an embodiment, the second conduit comprises a diptube, which has a first end that is connected to the valve, in particular to the mixing chamber, and which has an opposite second end with an intake opening that is arranged within 3 cm, preferably within 1.5 cm, from the second end of the container. In the first orientation the second end of the diptube thus extends into the gas phase while an intake opening of the first conduit is submerged in the liquid phase, and in the second orientation the second end of the diptube extends into the liquid phase while the intake opening of the first conduit is submerged in the gas phase. Preferably, the first conduit is arranged closer to the first side of the container than to the second side of the container.

In an embodiment the first conduit and the second conduit are configured such that, at a same predetermined pressure of the gas in the container and with same predetermined amounts of liquid phase and gas phase held in the container, the liquid/gas mixture that is sprayed upon actuation of the valve when the system in the first orientation has a higher ratio of liquid to gas than when the system is in the second orientation, preferably such that the ratio of liquid to gas in the sprayed mixture when the system is in the first orientation is at least a factor 1.5 greater than the ratio of liquid to gas in the sprayed mixture when the system is in the second orientation.

In an embodiment the valve comprises a nozzle button that is moveable along the longitudinal direction relative to the container for actuating the valve, wherein the nozzle extends through the nozzle button. Thus, when the system is in the first orientation, a person may contact the container using his or her fingers and press the container towards the nozzle button while the nozzle button remains stationary relative to the holder, for actuating the valve. When the system is in the second orientation, a person may contact the container and press it down towards the nozzle button in order to actuate the valve.

In an embodiment in the first orientation the nozzle button abuts the first abutment surface, and in the second orientation the second side of the container abuts the second abutment surface.

In an embodiment the nozzle button is rotationally fixed with respect to the container. For instance, a linear guide may be fixed to the container and adapted for guiding linear movement of the nozzle button along the longitudinal axis, while blocking rotation of the nozzle button relative to the container around the longitudinal axis.

In an embodiment the holder is provided with an opening for allowing a finger to contact the second side of the container and press the second side of the container down toward the nozzle for actuating the valve when the system is in the first orientation, and wherein the holder is provided with an opening for allowing a finger to contact the nozzle button and press the nozzle button down toward the second side of the container for actuating the valve when the system is in the second orientation. This allows the valve to be actuated, i.e. operated to open so that gas/liquid mixture is sprayed from the nozzle, from two different sides of the dispenser.

In an embodiment the dispensing system is adapted for keeping the nozzle stationary relative to the holder during actuation of the valve in the first orientation, and for letting the nozzle move relative to the holder along the longitudinal direction during actuation of the valve in the second orientation.

In an embodiment the holder is provided with one or more spray openings for allowing spray that is sprayed through the nozzle to pass through.

In an embodiment the one or more spray openings comprise a first opening and a second opening which are spaced apart from each other along the longitudinal direction, wherein in the first orientation the first opening is aligned with the nozzle and the second spray opening is substantially closed off, and wherein in the second orientation the second opening is aligned with the nozzle and the first spray opening is substantially closed off. A person using the spray can thus easily determine visually which of the two spray openings the gas/liquid mixture will be sprayed upon actuation of the valve.

In an embodiment the holder and the dispenser are provided with cooperating guides for preventing rotation of the nozzle relative to the holder during actuation of the valve. Such guides may for instance comprise a linear groove on the dispenser, e.g. on the nozzle button thereof, and a cooperating protrusion on the holder which projects into the groove, or vice versa.

In an embodiment the dispenser has a length that is greater than the length of the holder along the longitudinal direction. Both ends of the dispenser can thus project beyond the ends of the holder, making it particularly easy to press on the ends of the dispenser to actuate the valve.

In an embodiment a distance between the first abutment surface and the second abutment surface along the longitudinal direction is less than the length of the container along the longitudinal direction. For instance, the in this embodiment the first abutment surface may lie against the free first side of the container when the system is in the first orientation. Preferably the distance between the first and second abutment surface is less than half the length of the container.

In an embodiment the dispenser as a whole is slidable in the holder along the longitudinal direction. That is, the container and the nozzle are slidable in conjunction along the longitudinal direction, preferably freely slidable along the longitudinal direction within the holder. Thus, when the orientation of the system is changed from the first to the second orientation, gravity will cause the dispenser to abut the abutment surface associated with the orientation.

In an embodiment the system further comprises: a first blocking mechanism comprising first releasable engaging elements fixed respectively with respect to the holder and the nozzle, wherein the first elements are adapted for engaging each other to block linear movement of the nozzle relative to the holder along the longitudinal direction; and a second blocking mechanism comprising second releasable engaging elements fixed respectively with respect to the holder and the container, wherein the second elements are adapted for engaging each other to block linear movement of the container relative to the holder along the longitudinal direction; wherein the dispenser is moveable within the holder between a position in which the first engaging elements engage each other to block said linear movement of the nozzle relative to the holder, and a position in which the second engagement elements engage each other to block said linear movement of the container relative to the holder. The blocking mechanisms may for instance comprise a bayonet closure, or a groove and cooperating notch or the like.

In an embodiment the first engaging elements and/or the second engaging elements can be moved between an engaged state, in which they block linear movement, and a released state, in which they do not block the linear movement, by respectively rotating the nozzle or the container relative to the holder around the longitudinal axis. When the first or second engaging elements are in the engaged state, the valve can be actuated without causing movement of both the nozzle and the container at the same time.

In an embodiment the nozzle has an exit opening having a spray direction that is substantially normal to the longitudinal axis. This facilitates actuation of the valve by pressing the nozzle towards the container, as a finger pressing against the longitudinal ends of the dispenser will not block the nozzle exit opening.

In an embodiment the dispensing system comprises a liquid phase held in the container, and comprising a gas phase held in the container, wherein the gas phase is at a pressure of 2 bar or greater and is in direct contact with the liquid phase. This embodiments thus relates to the dispensing system that is filled with the liquid phase and gas phase which together are to be dispensed in a liquid/gas mixture.

BRIEF DESCRIPTION OF THE DRAWINGS

The present invention will be discussed in more detail below, with reference to the attached drawings, in which.

DETAILED DESCRIPTION OF THE DRAWINGS

Figures 1A, 1B:
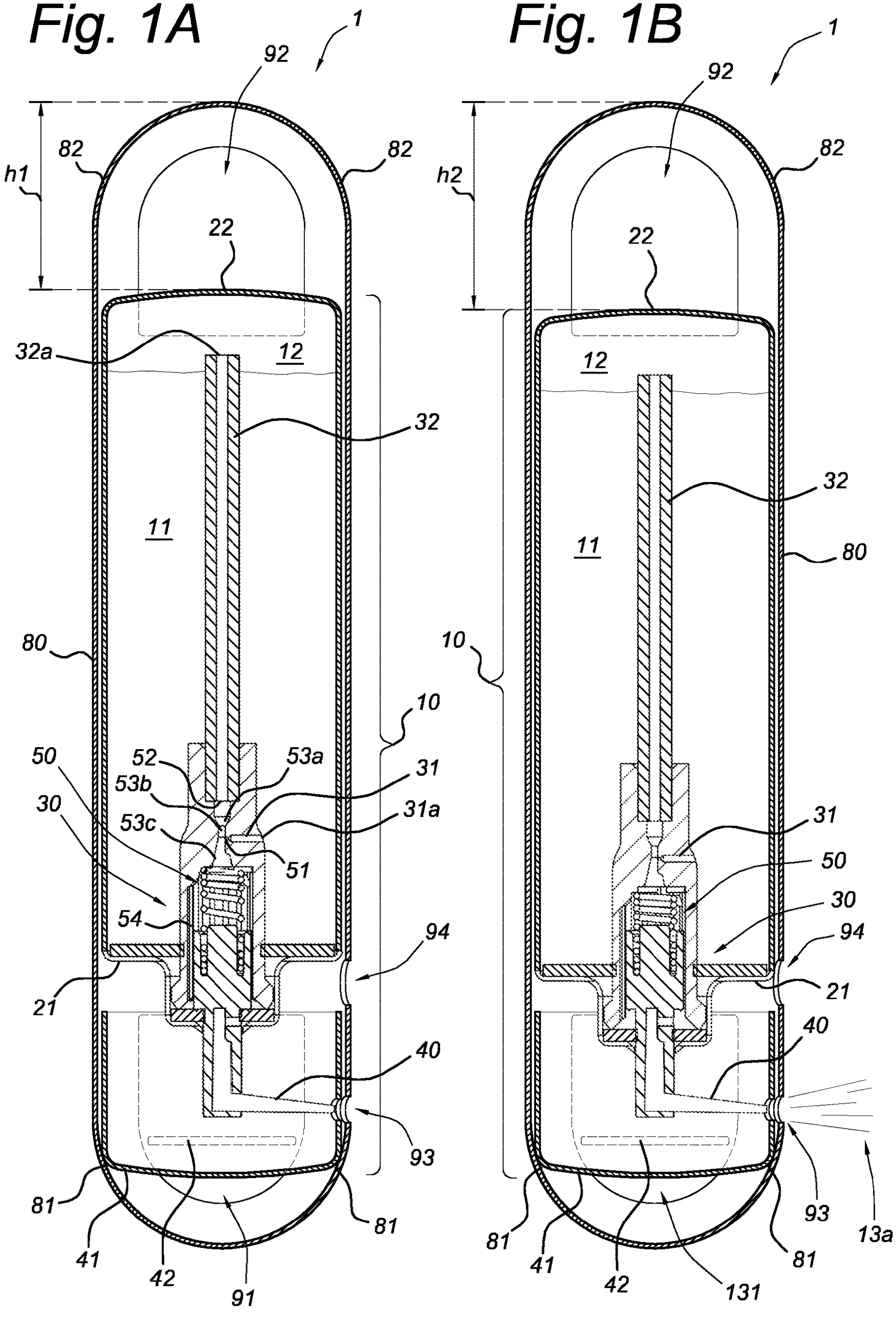
FIGS. 1A and 1B each show schematically a cross-sectional view of a dispensing system according to a first embodiment of the invention in a first orientation, respectively with the valve in a non-actuated state and an actuated state.

FIGS. 1A-1D show a dispensing system 1 according to the invention with its longitudinal axis substantially vertical. The system comprises a dispenser 10 and a holder 80 which surrounds the dispenser 10, the dispenser being moveable within the holder 80 between the first orientation, shown in FIGS. 1A and 1B, and a second orientation, shown in FIGS. 1C and 1D. The dispenser 10 comprises a container 20 which holds in its interior a liquid phase 11 and a gas phase 12 that is in direct contact with the liquid phase. The gas phase is at a pressure of about 2 bar and acts as a propellant gas for spraying the liquid phase 11. Along its longitudinal direction the container 20 has a first side 21 to which an actuatable valve 30 is attached, and an opposite second side 22. The valve 30 comprises a nozzle 40 which extends through a nozzle button 41 and through which the liquid/gas mixture can be sprayed when the nozzle button is pressed towards the second side 22 of the container. The valve 30 further comprises a mixing chamber 50, for mixing therein liquid phase 11 and gas phase 12 to form a liquid/gas mixture, and a first conduit 31 and a second conduit 32 for passage of the liquid and gas phase into the mixing chamber 50. The second conduit 32 has an opening proximate to the second side 22 at a distance of less 3 cm from the second side. The first conduit 31 has an opening 31*a* which debouches into the interior space of the container at a location closer to the first side 21 than to the second side 22 of the container 20.

The mixing chamber 50 comprises a first inlet opening 51 into the chamber that is in connection with the first conduit 31, a second inlet opening 52 into the chamber which is in connection with the second conduit, and comprises an outlet 54 which is in fluid connection with the nozzle 40 when the valve is actuated. The mixing chamber comprises a Venturi tube 53*a*,53*b*,53*c* which has an entry cone 53*a* that is connected to the second inlet opening 52, an exit cone 53*c* and a constricted section 53*b* that connects the entry cone with the exit cone. The constricted section 53*b* is connected to the first inlet opening 51 which, in the example shown, has a cross-sectional opening area of about $40\times10^{-3}$ mm$^2$. The constricted section has a cross-sectional opening area that is significantly larger than that of the first inlet opening. In the example of FIG. 1A, the constricted section has a cross sectional area where it debouches into the mixing chamber of about 100×10−3 mm$^2$. The exit cone 53*c* is connected to an outlet 54 of the chamber. When the valve is actuated this outlet 54 is in fluid connection with nozzle 40 for spraying the mixture therefrom.

In the orientation of the dispensing system shown in FIGS. 1A and 1B, first conduit 31 fluidly connects the mixing chamber to the liquid phase 11, and second conduit 32 fluidly connects the mixing chamber to the gas phase 12.

FIGS. 1A and 1B show the dispensing system in the first orientation, with its longitudinal axis substantially vertical, with the second side 22 vertically above the first side 21, and with the nozzle button 41 abutting first abutment surface 81 which prevents further downward movement of the nozzle button relative to the holder 80. Though the nozzle and nozzle button cannot be pushed downward relative to the holder in this orientation, the container 20 can be pushed from its second side 22 downward relative to the holder to actuate the valve 30. In order to provide access to the second side 22 the holder is provided with a second finger opening 92 which allows a part of a finger to pass therethrough and contact the second side to push it down.

When the valve 30 is actuated in this manner the gas phase 12 enters the mixing chamber from above while liquid phase 11 enters the mixing chamber 50 at a lower point and the passage of the gas phase through the mixing chamber causes liquid phase to be draw into the mixing chamber due to the Venturi effect. As shown in FIG. 1B, a gas phase and liquid phase that have mixed in the mixing chamber are then dispensed through opening of nozzle 40, and through a first spray opening 93 in the holder, which first spray opening 93 is fixed and aligned with the nozzle opening when the system is in the first orientation.

FIG. 1A shows the valve 30 in a non-actuated state, in which it is closed and prevents liquid/gas mixture from escaping from the container 20. FIG. 1B shows the valve in an actuated state in which it is completely open so that a liquid/gas mixture 13*a* is sprayed from the opening of the nozzle 40. In the non-actuated state shown in FIG. 1A the distance between second side of the container and the closest distal end of the holder 80 is h1, which is less than the distance h2 between second side of the container and the closest distal end of the holder 80 when the valve is actuated as shown in FIG. 1B.

Figure 1C:
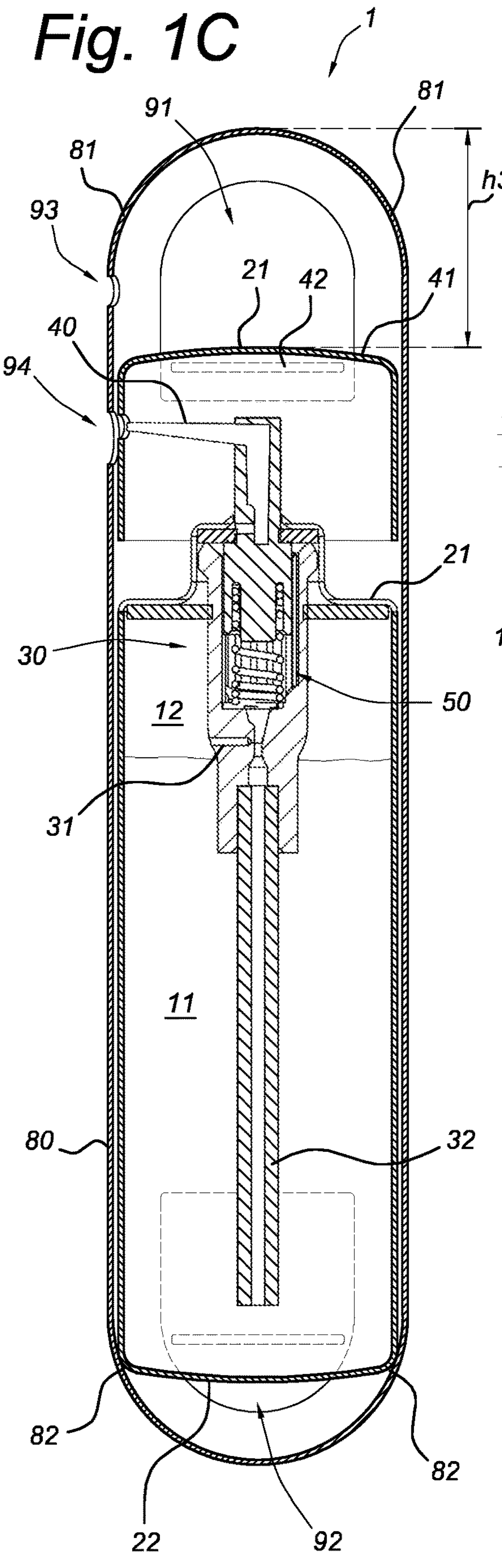
FIGS. 1C and 1D each show schematically a cross-sectional view of the dispensing system of FIGS. 1A and 1B in a second orientation, respectively with the valve in a non-actuated state and an actuated state.
Figure 1D:
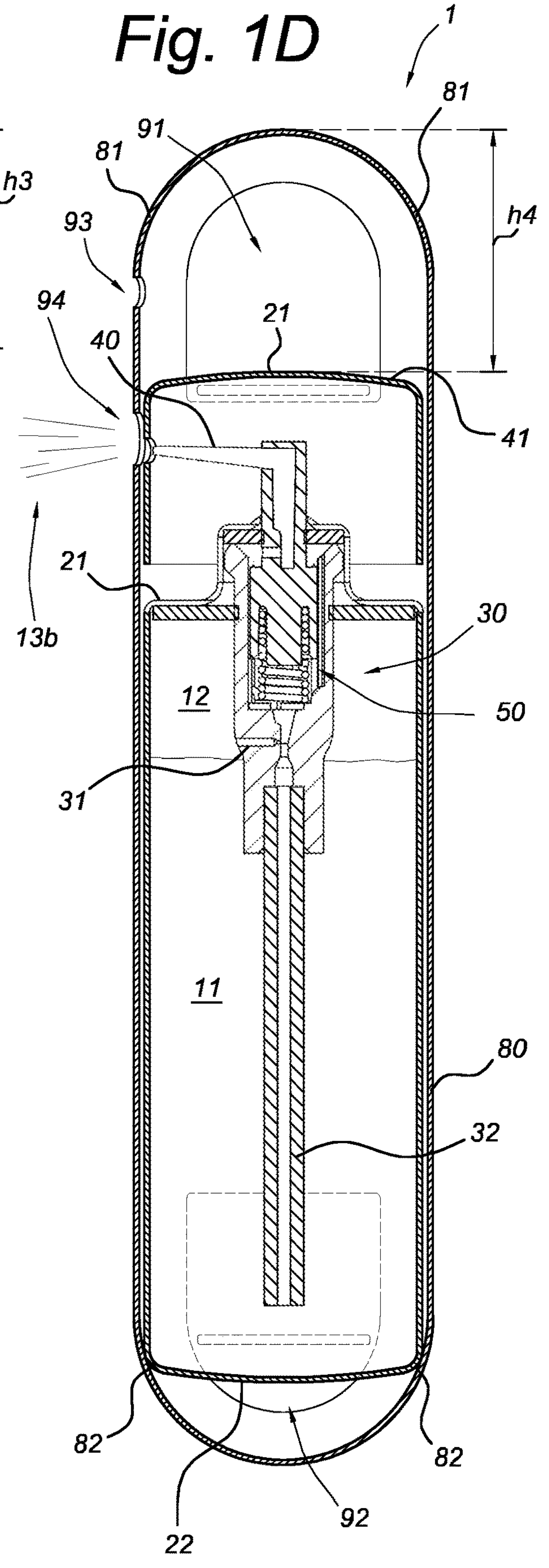

FIGS. 1C and 1D show the dispensing system 1 in the second orientation, with its longitudinal axis substantially vertical and with the first side 21 of the container 20 arranged vertically above the second side 21, wherein the second side of the container abuts a second abutment surface 82 of the holder, so that the container cannot be pushed further downward relative to the holder 80. In the second orientation, the first conduit 31 of valve 30 fluidly connects the mixing chamber 50 to the gas phase 12, while the second conduit 32 fluidly connects the mixing chamber to the liquid phase 11. When the valve 30 is actuated, as shown in FIG. 1D, the gas phase will exert pressure on the liquid phase 11 in the container, in this manner pushing liquid into the mixing chamber via the second conduit 32. At the same time, pressurized gas enters the mixing chamber and mixed with the liquid to form a gas/liquid mixture 13*b*. When compared to the gas/liquid mixture 13*a* of FIG. 1B, the ratio of gas to liquid in the mixtures is greater in mixture 13*b* than in mixture 13*a*. This allows the dispenser system 1 to be used in the second orientation when precise dosage of liquid in the gas/liquid mixture is to be applied, and when greater amounts of liquid are to be applied, the dispenser system 1 is used in the first orientation. When the amounts of gas phase and liquid phase are the same in the embodiments of FIGS. 1B and 1D and the gas pressure is equal as well, the ratio of liquid:gas in spray 13*b* is about 1.7 times greater than in spray 13*a*.

When the system is in the second orientation, a person can actuate the valve 30 by inserting his or her finger through the first finger opening 91 and contacting the nozzle button 41 and pressing it down using his or her finger. During this, the nozzle opening may move relative to the housing 80, and in particular relative to the second spray opening 94 in the housing, as the gas/liquid mixture is sprayed from second spray opening 94. To prevent part of the mixture from being sprayed onto the interior of the housing, the second spray opening 94 has a greater length along the longitudinal direction of the holder 80 than the first spray opening.

The nozzle button 41 is provided with a protrusion 42 having a width substantially equal to the width of the first finger opening and adapted for sliding in the first finger opening 91 in such a manner that rotation of the nozzle button around the longitudinal axis is substantially blocked.

In this manner the first finger opening 91 and protrusion 42 act as cooperating guides which ensure that the nozzle opening remains rotationally aligned with the spray openings 93, 94.

Figure 2:
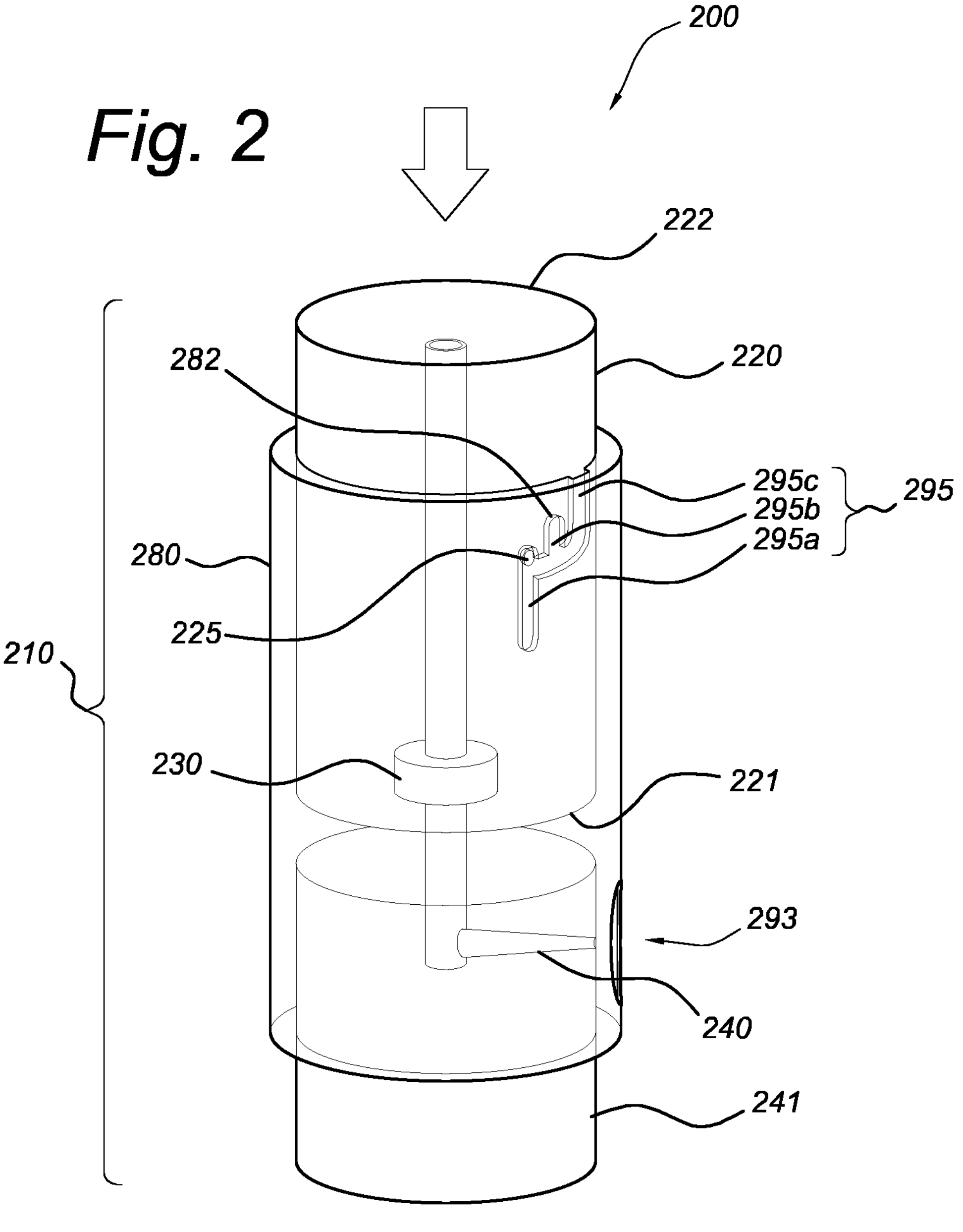
FIGS. 2, 3, 4A, 4B, 5 and 6 schematically show further embodiments of a dispensing system of the invention, in which the valve and interior of the container are substantially the same as in the embodiment of FIGS. 1A-1D, but with different structures for preventing the dispenser from moving out of the holder and in which in different orientations of the dispensing system both the dispenser and the holder can be pressed to actuate the valve.

FIG. 2 schematically shows a dispensing system 200 according to a second embodiment of the invention, with a transparent holder 280 which surrounds a transparent dispenser 210, the dispenser 210 comprising a container 220, valve 230, nozzle 240, nozzle button 241 and the like similar to the container 20, valve 30, nozzle 40, and nozzle button 41 as described above. The dispenser has a length along the longitudinal direction of the holder which is greater than the length of the holder 290, so that the second side 222 of the container 220 extends beyond a first distal end of the holder 290 and a portion of nozzle button 241 extends beyond an opposite, second distal end of the holder 290. Both the second side 222 and the nozzle button 240 are thus accessible, e.g. to be contacted by a user's finger, at all times. A single spray opening 292 is of sufficient size to allow spray from the nozzle opening to pass therethrough, regardless of whether the system is in the first orientation shown, or in the second orientation To prevent the dispenser 210 from moving completely out of the holder, both the container 220 and the nozzle button 241 are provided with a blocking mechanism, which blocking mechanisms also provide the first and second abutment surface. Though FIG. 2 shows only the blocking mechanism 225,295 for keeping part of the container 220 within the holder 280, a similar blocking mechanism is provided for keeping part of the nozzle button 241 within the holder. The blocking mechanism 225,295 shown comprises a pin 225 protruding from the outer surface of the container 220, and grooves 295*a*, 295*b* which extend in the longitudinal direction and are arranged on the inner surface of the holder for slidingly holding therein the pin 225. An additional groove 295*c* is shown, which provided for easy of assembly of the system, but which is not required for the present invention. FIG. 2 shows the system in a first orientation, with the second side 222 of the container above the first side 221 of the container, and wherein the pin 225 is spaced apart form second abutment surface 282 which is formed by an upper edge of groove 295*b*. In this orientation, when longitudinal movement of the nozzle button 241 relative to the holder 280 is blocked, the valve can be actuated by a user pressing his or her finger against the second side 222 of container towards the nozzle button 241. When the system is rotated 180 degrees, the container can be rotated around its longitudinal axis relative to the holder until the pin 225 is located in groove 295*b* and abuts the abutment surface 282 thereof. The second blocking mechanism between the nozzle button and the container will then allow linear movement between these in order to actuate the valve.

Figure 3:
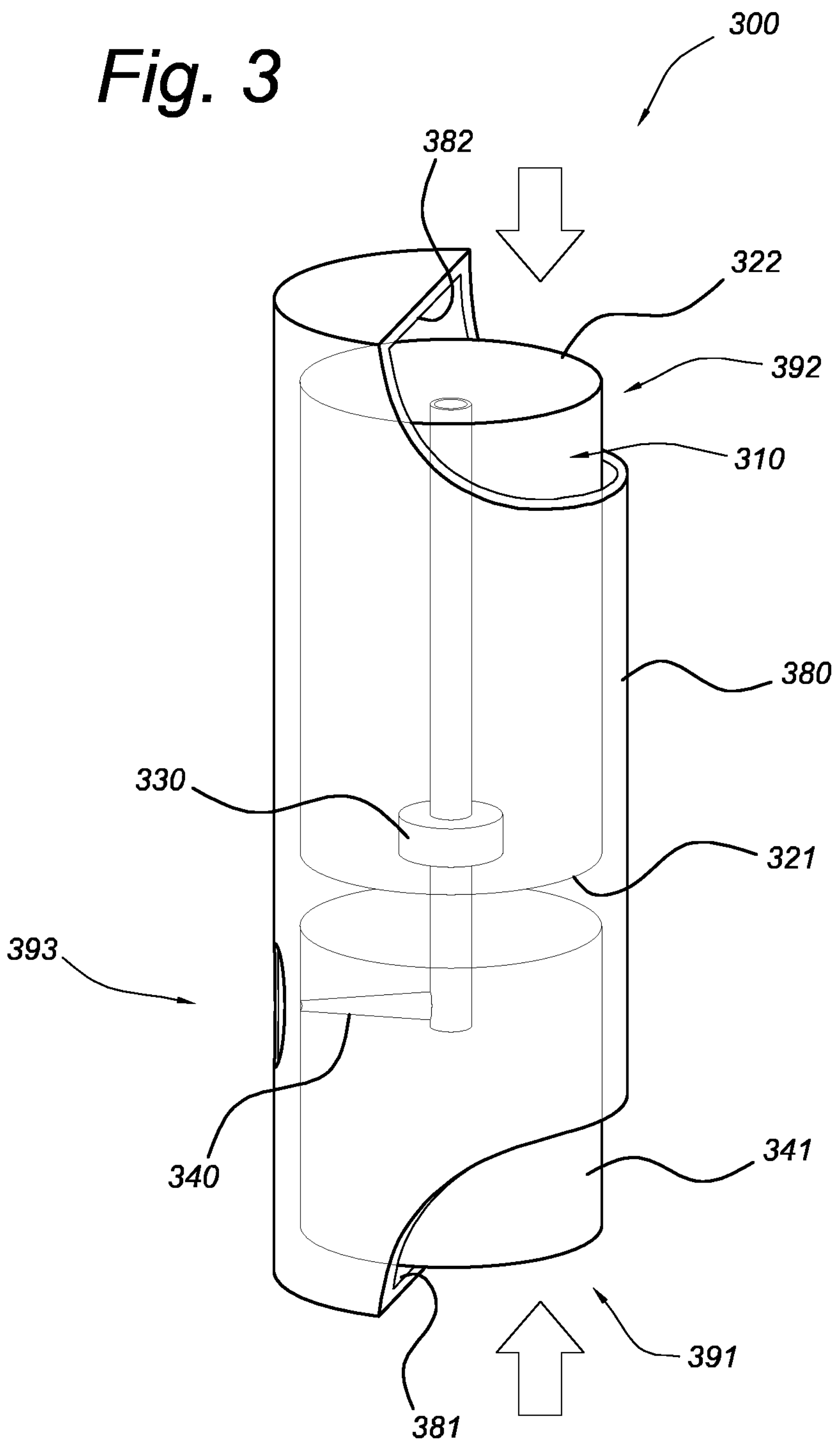

FIG. 3 shows another embodiment of the invention, with a holder 380 which surrounds a dispenser 310 comprising a container 320 with a first side 321 and a second side, a nozzle 340 with a nozzle button 341. The holder has a length that is greater than the length of the dispenser when the valve 30 is not actuated, and first abutment surfaces 381 and second abutment surface prevent the dispenser from moving out of the holder. As in FIG. 2, only a single spray opening 292 is provided.

Figure 4A:
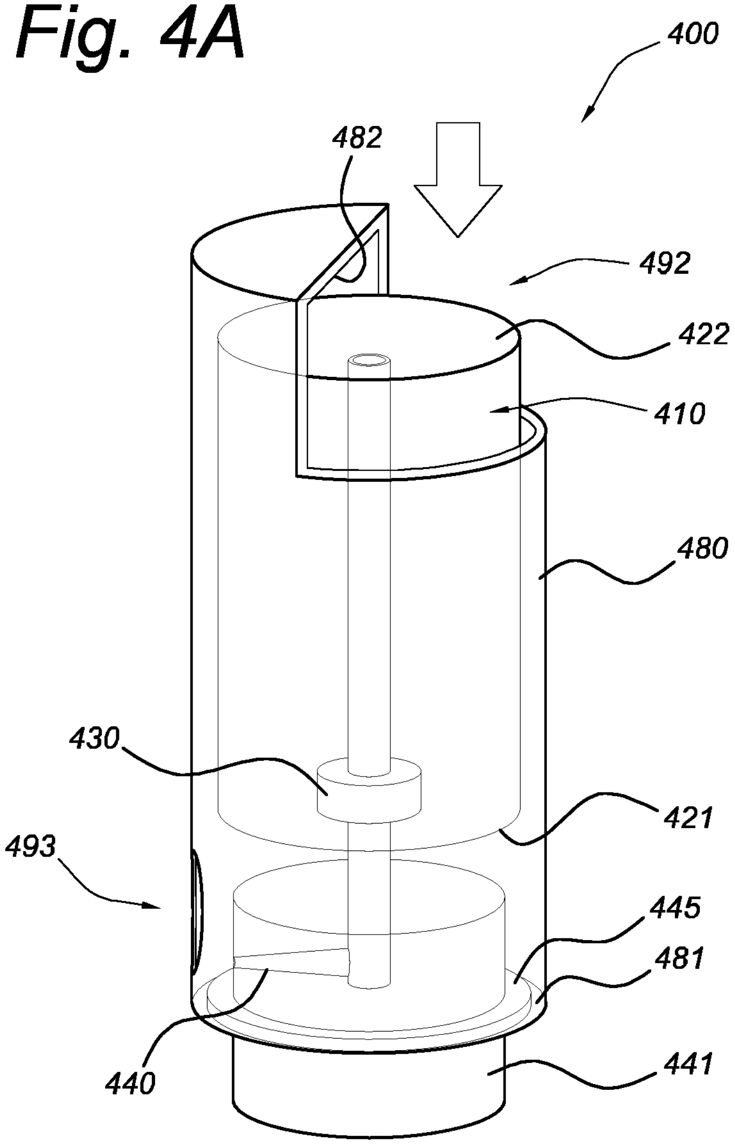
Figure 4B:
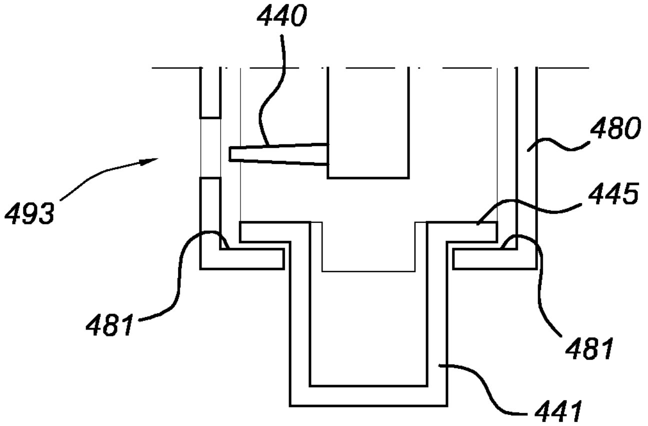

FIGS. 4A and 4B respectively shows another embodiment 400 of the invention and a detail thereof. The holder comprises a second abutment surface 482 which is similar to abutment surface 382 of FIG. 3. The nozzle button 441 is provided with a radial flange 445, which in the first orientation of the system 400 shown, abuts first abutment surface 481. As in FIGS. 2 and 3, only a single spray opening 292 is provided. The dispenser 410 has a length that is greater than the length of the holder.

Figure 5:
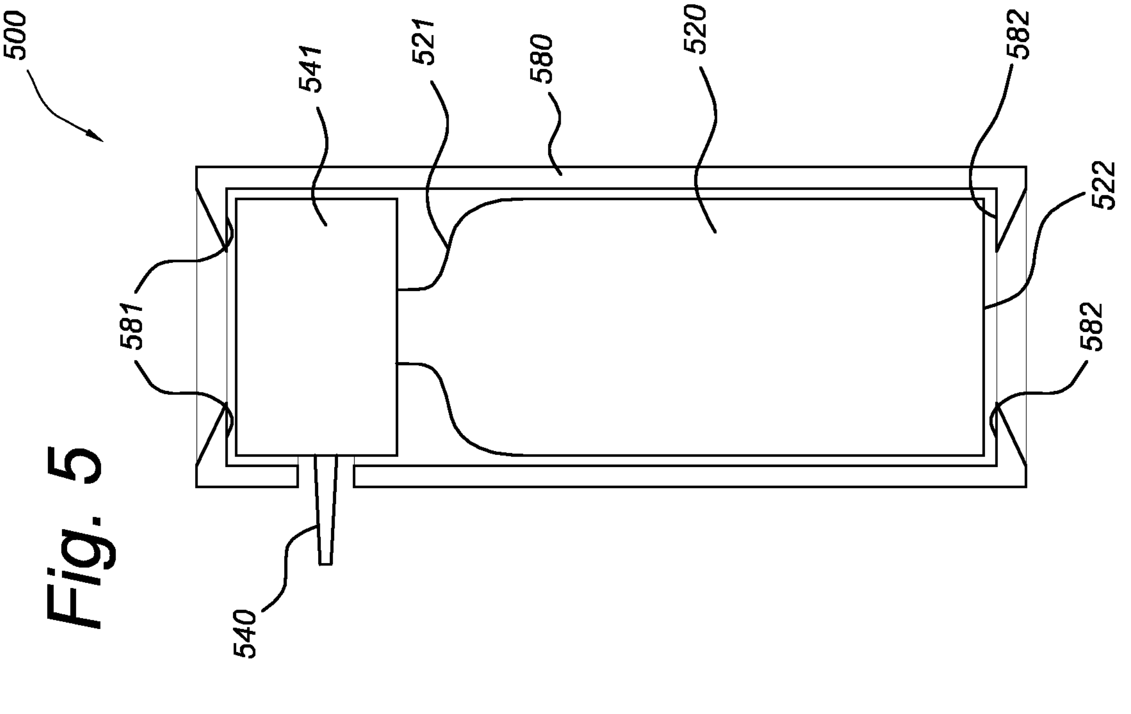

FIG. 5 shows a further embodiment of a system 500 according to the invention. In this embodiment, when the valve is not actuated as shown, the nozzle button 541 abuts the first abutment surface 581 of the holder, and the second side 522 of the container 520 abuts second abutment surface 582 of the holder 580. At both distal ends the holder is provided with an opening, allowing a user to press his or her finger either on the nozzle button 541 towards the second abutment surfaces 582, or on the second side 522 of the container towards the first abutment surfaces to actuate the valve.

Figure 6:
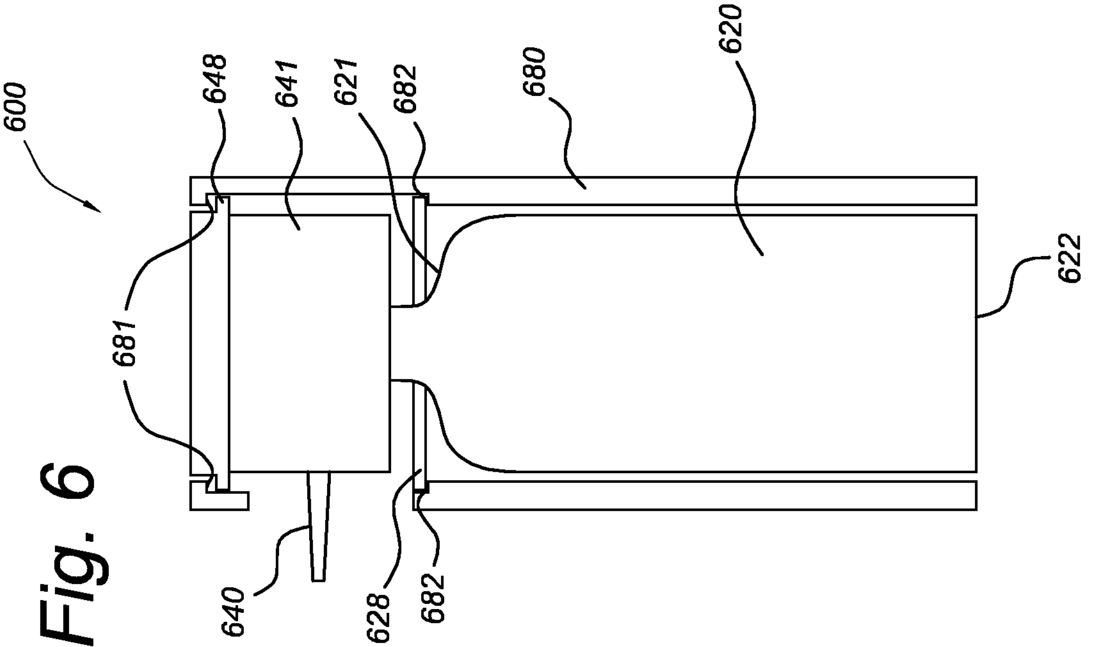

FIG. 6 shows yet another embodiment of a dispensing system according to the invention.

Here the first and second abutment surfaces 681,682 of the holder 680 are at a longitudinal distance from each other which is less than half the length of the container 620. Flanges 628,648 are fixed respectively to the container 620 and to the nozzle button 641, and in combination with the abutment surfaces prevent the container and nozzle button falling out of the holder 680.

In summary, the present invention provides a dispensing system for spraying a liquid/gas mixture, the system comprising a dispenser and a holder in which the dispenser is held, the dispenser comprising a container that is adapted for holding therein a liquid phase and a gas phase that is at a pressure of 2 bar or greater (e.g. between 2.5 and 8 bar) and is in direct contact with the liquid phase. The dispensing system may be used in a first orientation and a second orientation, wherein the ratio of liquid to gas in the sprayed mixture is different depending on the orientation of the system during spraying.

The present invention has been described above with reference to a number of exemplary embodiments as shown in the drawings. Modifications and alternative implementations of some parts or elements are possible, and are included in the scope of protection as defined in the appended claims.

The invention claimed is:

1. A dispensing system for spraying a liquid/gas mixture, the dispensing system comprising a dispenser that is provided with:

a container having a first side and a second side and a longitudinal axis extending from the first side to the second side, wherein the container is adapted for holding therein a liquid phase and a gas phase with the gas phase in direct contact with the liquid phase and at a pressure of 2 bar or greater;

an actuatable valve comprising a nozzle for spraying the liquid/gas mixture upon actuation of the valve, wherein the valve is attached to the container at the first side, wherein the actuatable valve comprises a mixing chamber adapted for mixing the liquid phase and the gas phase to form the liquid/gas mixture and delivering the mixture to the nozzle, wherein the actuatable valve comprises a first conduit and a separate second conduit, both in fluid connection with the mixing chamber, arranged for passage of the liquid phase and the gas phase into the mixing chamber;

wherein the dispensing system further comprises:

a holder surrounding the dispenser and provided with a first abutment surface for blocking movement of the dispenser out of the holder past the first abutment surface, and a second abutment surface for blocking movement of the dispenser out of the holder past the second abutment surface;

characterized in that the valve is arranged to be actuated with the dispensing system in two different orientations, wherein in a first orientation the longitudinal axis of the container is oriented vertically, the second side of the container is arranged vertically above the first side of the container, and the dispenser abuts the first abutment surface, with the first conduit arranged for passage of the liquid phase from the container into the mixing chamber and the second conduit arranged for passage of the gas phase from the container into the mixing chamber upon actuation of the valve; and in a second orientation the longitudinal axis of the container is oriented vertically, the the first side of the container is arranged vertically above the second side of the container, and the dispenser abuts the second abutment surface, with the first conduit arranged for passage of the gas phase from the container to the mixing chamber and the second conduit arranged for passage of the liquid phase from the container to the mixing chamber upon actuation of the valve.

2. The dispensing system according to claim 1, wherein, at least when the valve is actuated, when the dispensing system is in the first orientation the dispenser is spaced apart from the second abutment surface, and when the dispensing system is in the second orientation the dispenser is spaced apart from the first abutment surface.

3. The dispensing system according to claim 1, wherein when the dispensing system is in the first orientation, the second side of the container is movable relative to the holder along the longitudinal direction towards the nozzle while the nozzle remains stationary to with respect to the holder, and when the system is in the second orientation, the nozzle is movable relative to the holder along the longitudinal direction towards the second side of the container while said second side remains stationary with respect to the holder.

4. The dispensing system according to claim 1, wherein the first conduit and the second conduit are configured such that, at a same pressure of the gas in the container and with a same amounts of the liquid phase and the gas phase held in the container, the liquid/ gas mixture that is sprayed upon actuation of the valve when the system in the first orientation has a higher ratio of liquid to gas than when the system is in the second orientation.

5. The dispensing system according to claim 1, wherein the valve comprises a nozzle button that is moveable along the longitudinal direction relative to the container for actuating the valve, wherein the nozzle extends through the nozzle button.

6. The dispensing system according to claim 5, wherein in the first orientation the nozzle button abuts the first abutment surface, and wherein in the second orientation the second side of the container abuts the second abutment surface.

7. The dispensing system according to claim 5, wherein the nozzle button is rotationally fixed with respect to the container.

8. The dispensing system according to claim 5, wherein the holder is provided with an opening for allowing a finger to contact the second side of the container and press the second side of the container down toward the nozzle for actuating the valve when the system is in the first orientation, and wherein the holder is provided with an opening for allowing a finger to contact the nozzle button and press the nozzle button down toward the second side of the container for actuating the valve when the system is in the second orientation.

9. The dispensing system according to claim 1, adapted for keeping the nozzle stationary relative to the holder during actuation of the valve in the first orientation, and for letting the nozzle move relative to the holder along the longitudinal direction during actuation of the valve in the second orientation.

10. The dispensing system according to claim 1, wherein the holder is provided with one or more spray openings for allowing spray that is sprayed through the nozzle to pass through.

11. The dispensing system according to claim 10, wherein the one or more spray openings comprise a first opening and a second opening which are spaced apart from each other along the longitudinal direction, wherein in the first orientation the first spray opening is aligned with the nozzle and the second spray opening is closed off, and wherein in the second orientation the second spray opening is aligned with the nozzle and the first spray opening is closed off.

12. The dispensing system according to claim 1, wherein the holder and the dispenser are provided with cooperating guides for preventing rotation of the nozzle relative to the holder during actuation of the valve.

13. The dispensing system according to claim 1, wherein the dispenser has a length that is greater than the length of the holder along the longitudinal direction.

14. The dispensing system according to claim 1, wherein a distance between the first abutment surface and the second abutment surface along the longitudinal direction is less than the length of the container along the longitudinal direction.

15. The dispensing system according to claim 1, wherein the dispenser as a whole is slidable in the holder along the longitudinal direction.

16. The dispensing system according to claim 1, wherein the system further comprises:

a first blocking mechanism comprising first releasable engaging elements fixed respectively with respect to the holder and the nozzle, wherein the first elements are adapted for engaging each other to block linear movement of the nozzle relative to the holder along the longitudinal direction; and a second blocking mechanism comprising second releasable engaging elements fixed respectively with respect to the holder and the container, wherein the second elements are adapted for engaging each other to block linear movement of the container relative to the holder along the longitudinal direction;

wherein the dispenser is moveable within the holder between a position in which the first engaging elements engage each other to block said linear movement of the nozzle relative to the holder, and a position in which the second engagement elements engage each other to block said linear movement of the container relative to the holder.

17. The dispensing system of claim 16, wherein the first engaging elements and/or the second engaging elements can be moved between an engaged state, in which the first engaging elements and/or the second engaging elements block linear movement, and a released state, in which the first engaging elements and/or the second engaging elements do not block the linear movement, by respectively rotating the nozzle or the container relative to the holder around the longitudinal axis.

18. The dispensing system according to claim 1, wherein the nozzle has an exit opening having a spray direction that is -normal to the longitudinal axis.

19. The dispensing system according to claim 1, comprising the liquid phase held in the container, and comprising the gas phase held in the container, wherein the gas phase is at a pressure of 2 bar or greater and is in direct contact with the liquid phase.

20. The dispensing system according to claim 1, wherein the mixing chamber has an operational internal volume and comprises a first inlet opening in connection with the first conduit, a second inlet opening in connection with the second conduit, an outlet, and a venturi tube having an entry cone for receiving the gas phase or the liquid phase through the second inlet opening, an exit cone and a constricted section that connects the entry cone with the exit cone, said constricted section or said exit cone connected to the first inlet opening, the first inlet opening having a cross-sectional opening area of $8\times10^{-3}$ to $100\times10^{-3}$ $mm^2$ and the constricted section having a cross-sectional opening area that is at least 150% larger than the cross-sectional opening area of the first inlet opening.

* * * * *